United States Patent
Sakayori et al.

(10) Patent No.: US 12,391,237 B2
(45) Date of Patent: Aug. 19, 2025

(54) VEHICLE SUPERVISION DEVICE

(71) Applicant: HITACHI ASTEMO, LTD., Hitachinaka (JP)

(72) Inventors: Go Sakayori, Tokyo (JP); Yoshitaka Atarashi, Tokyo (JP); Hideki Endo, Tokyo (JP); Noriyasu Hasejima, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 170 days.

(21) Appl. No.: 18/551,673

(22) PCT Filed: Mar. 4, 2022

(86) PCT No.: PCT/JP2022/009352
§ 371 (c)(1),
(2) Date: Sep. 21, 2023

(87) PCT Pub. No.: WO2022/219962
PCT Pub. Date: Oct. 20, 2022

(65) Prior Publication Data
US 2024/0166195 A1 May 23, 2024

(30) Foreign Application Priority Data
Apr. 16, 2021 (JP) ................. 2021-069894

(51) Int. Cl.
*B60W 30/06* (2006.01)
*B60W 60/00* (2020.01)
*G06V 20/52* (2022.01)

(52) U.S. Cl.
CPC .......... *B60W 30/06* (2013.01); *B60W 60/001* (2020.02); *G06V 20/52* (2022.01);
(Continued)

(58) Field of Classification Search
CPC ............... B60W 30/06; B60W 60/001; B60W 2530/10; B60W 2556/20; G06V 20/52;
(Continued)

(56) References Cited

U.S. PATENT DOCUMENTS 9,274,525 B1 * 3/2016 Ferguson ............... B60W 10/18
2022/0234609 A1 * 7/2022 Anami ................. B60W 60/001
2023/0382389 A1 * 11/2023 Mochizuki ............ B60W 40/02

FOREIGN PATENT DOCUMENTS

| | | |
|---|---|---|
| JP | 2020-035108 A | 3/2020 |
| JP | 2020-149334 A | 9/2020 |
| JP | 2022-031125 A | 2/2022 |

OTHER PUBLICATIONS

International Search Report with English Translation and Written Opinion of International Patent Application No. PCT/JP2022/009352 dated May 17, 2022 (9 pages).

* cited by examiner

*Primary Examiner* — Daryl C Pope
(74) *Attorney, Agent, or Firm* — Foley & Lardner LLP

(57) ABSTRACT

The present disclosure provides a vehicle coordinating device capable of improving the accuracy of following a target path of a vehicle. A vehicle coordinating device 1 that coordinates automatic driving of a vehicle 2 by a vehicle control device 21 mounted on the vehicle 2 includes a communication unit 11, a vehicle characteristic identification unit 12, and an identification accuracy estimation unit 13. The communication unit 11 is communicably connected to the vehicle control device 21. The vehicle characteristic identification unit 12 acquires a control command value of the automatic driving and a traveling locus of the vehicle 2 from the vehicle control device 21 via the communication unit 11, and identifies the vehicle characteristic used for the automatic driving. The identification accuracy estimation
(Continued)

unit 13 estimates the identification accuracy of the vehicle characteristic by the vehicle characteristic identification unit 12. The automatic driving coordinating unit 14 coordinates the automatic driving of the vehicle 2 based on the identification accuracy estimated by the identification accuracy estimation unit 13.

12 Claims, 8 Drawing Sheets

(52) U.S. Cl.
 CPC ..... *B60W 2530/10* (2013.01); *B60W 2556/20* (2020.02); *G06V 2201/08* (2022.01)
(58) Field of Classification Search
 CPC ........ G06V 2201/08; G08G 1/14; G08G 1/16; G16Y 10/40; G16Y 20/20; G16Y 40/30
 See application file for complete search history.

VEHICLE SUPERVISION DEVICE

TECHNICAL FIELD

The present disclosure relates to a vehicle coordinating device.

BACKGROUND ART

Conventionally, an invention related to a parking control device has been known. A parking control device described in PTL 1 includes an acquisition unit and a determination unit. The acquisition unit acquires performance information regarding performance of a peripheral sensing function of a vehicle. The determination unit determines a parking position of the vehicle based on the performance information acquired by the acquisition unit (abstract, claim 1, paragraph 0006, or the like).

This conventional parking control device includes a collection unit that collects a detection result of a sensor from a parked vehicle parked in a parking lot, and an output unit that, when performance of a traveling vehicle traveling in the parking lot is low, outputs auxiliary information for assisting traveling of the traveling vehicle based on the detection result collected by the collection unit (claim 4, paragraph 0030, and paragraphs 0060 to 0063 in PTL 1). As a result, since an infrastructure sensor becomes unnecessary by using the detection result of the high-performance vehicle sensor, it is possible to suppress the increase in cost of an initial introduction of a parking system (paragraph 0027 in PTL 1).

In addition, an invention related to a vehicle control device has been conventionally known. A vehicle control device described in PTL 2 is mounted on a vehicle. The vehicle control device includes an automatic driving execution unit, a first target position acquisition unit, a second target position acquisition unit, and a target position setting unit (abstract, claim 1, and paragraph 0006).

The automatic driving execution unit executes automatic driving so as to cause the vehicle to reach a target position set in a predetermined area. The first target position acquisition unit acquires a first target position as a candidate for a target position specified based on area data set in advance for a predetermined area. The second target position acquisition unit acquires a second target position as another candidate for a target position specified based on sensor data obtained by a sensor that detects a situation around the vehicle. The target position setting unit sets one of a first target position and a second target position as a target position based on a relationship between the first target position and the second target position.

According to the above-described conventional vehicle control device, any one of the first target position and the second target position can be selectively set as the target position, and thus, for example, unlike a case where only the first target position is present as the candidate for the target position, it is possible to improve the accuracy of the automatic driving (PTL 2, paragraph 0007).

CITATION LIST

Patent Literature

PTL 1: JP 2020-149334 A
PTL 2: JP 2020-035108 A

SUMMARY OF INVENTION

Technical Problem

In the conventional parking control device, when accuracy of following a target path of the traveling vehicle traveling in the parking lot based on the auxiliary information output by the collection unit is low, there is a possibility that the vehicle cannot reach the target position. Similarly, in the conventional vehicle control device described above, even when one of the first target position and the second target position is selectively set as the target position, there is a possibility that the vehicle cannot reach the target position when the accuracy of following the target path of the vehicle is low.

The present disclosure provides a vehicle coordinating device capable of improving the accuracy of following a target path of a vehicle.

Solution to Problem

According to an aspect of the present disclosure, there is provided a vehicle coordinating device that coordinates automatic driving of a vehicle by a vehicle control device mounted on the vehicle, the vehicle coordinating device including: a communication unit communicably connected to the vehicle control device; a vehicle characteristic identification unit that acquires a control command value for automatic driving and a traveling locus of the vehicle from the vehicle control device via the communication unit and identifies a vehicle characteristic used for automatic driving; an identification accuracy estimation unit that estimates identification accuracy of the vehicle characteristic by the vehicle characteristic identification unit; and an automatic driving coordinating unit that coordinates automatic driving of the vehicle based on the identification accuracy estimated by the identification accuracy estimation unit.

Advantageous Effects of Invention

According to the present disclosure, it is possible to provide a vehicle coordinating device capable of improving the accuracy of following a target path of a vehicle.

DESCRIPTION OF EMBODIMENTS

Hereinafter, an embodiment of a vehicle coordinating device according to the present disclosure will be described with reference to the drawings.

First Embodiment

Figure 1:
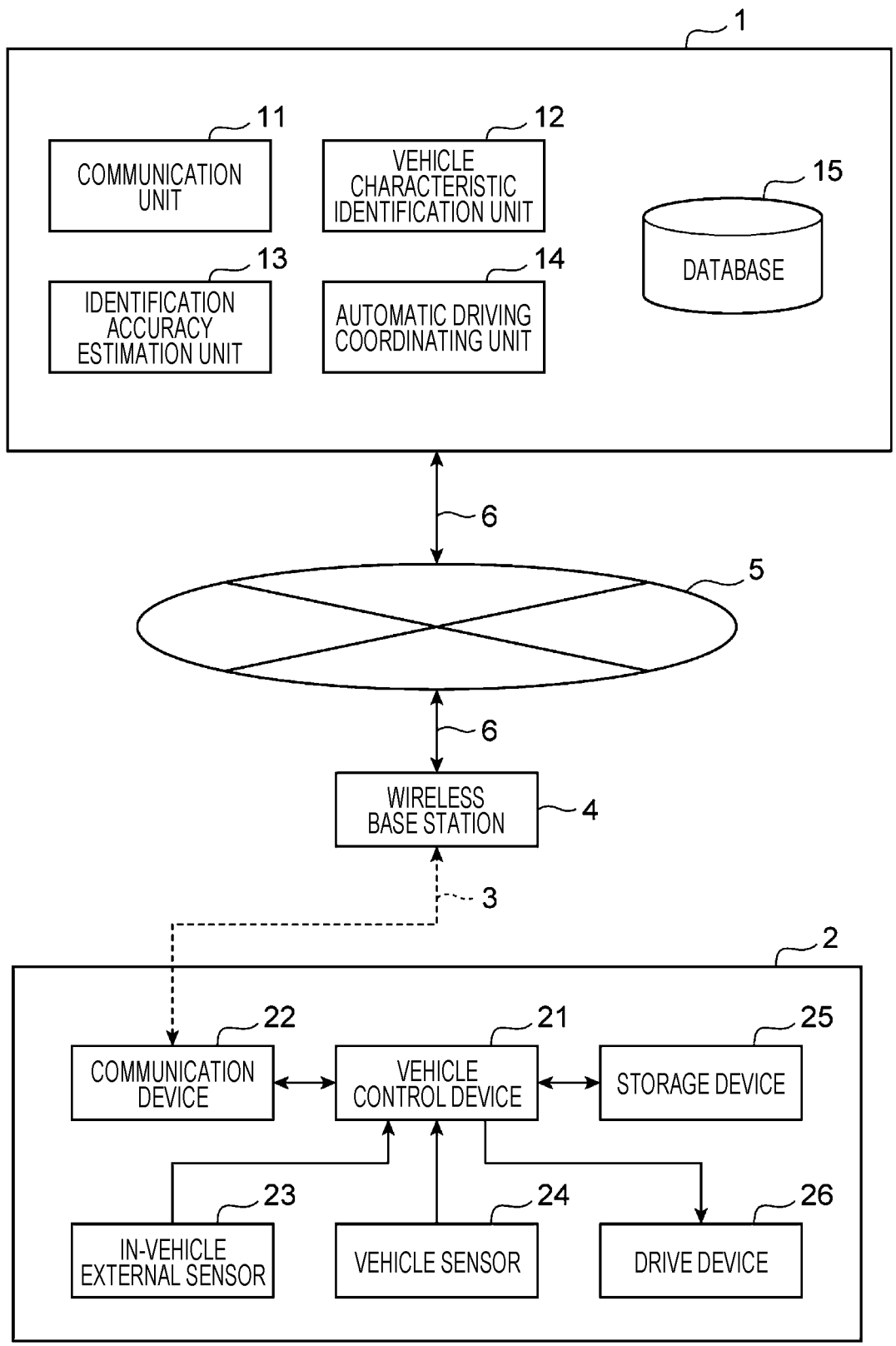
FIG. 1 is a block diagram illustrating a first embodiment of a vehicle coordinating device according to the present disclosure.
Figure 2:
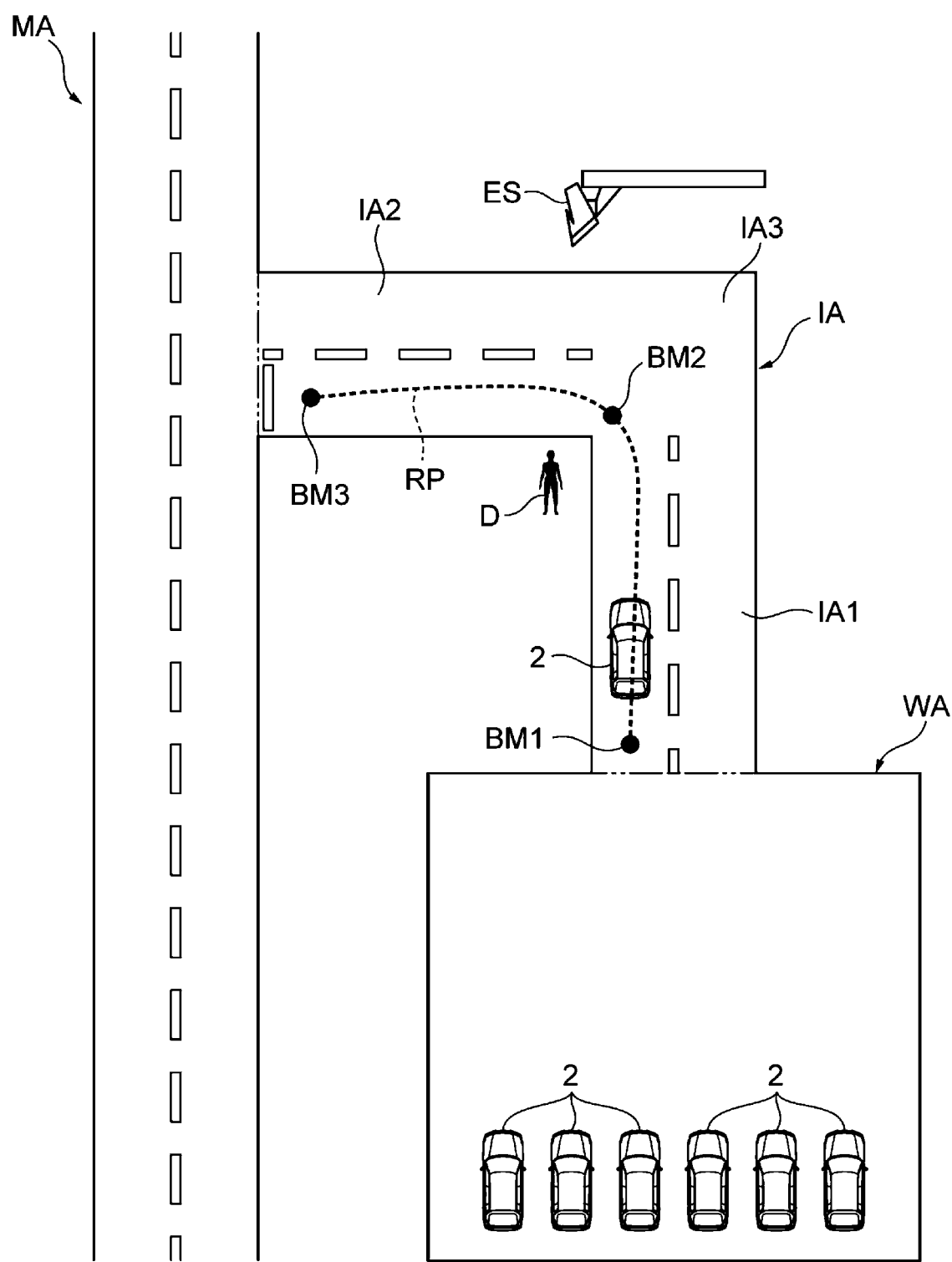
FIG. 2 is a schematic plan view illustrating an example of vehicle coordination by the vehicle coordinating device of FIG. 1.

FIG. 1 is a block diagram illustrating a first embodiment of a vehicle coordinating device according to the present disclosure. FIG. 2 is a schematic plan view illustrating an example of vehicle coordination by the vehicle coordinating device 1 of FIG. 1. The vehicle coordinating device 1 of the present embodiment is, for example, a device that controls automatic driving of a vehicle 2 by the vehicle control device 21 mounted on the vehicle 2 used for on-demand traffic and last one mile mobility. For example, the vehicle coordinating device 1 is communicably connected to a plurality of vehicle control devices 21 mounted on a plurality of vehicles 2, and coordinates automatic driving of the plurality of vehicles 2.

The vehicle 2 coordinated by the vehicle coordinating device 1 includes, for example, the vehicle control device 21, a communication device 22, an in-vehicle external sensor 23, a vehicle sensor 24, a storage device 25, and a drive device 26. The vehicle control device 21 is, for example, an electronic control device (ECU) that is mounted on the vehicle 2 and performs automatic driving of the vehicle 2. The vehicle control device 21 is connected to the communication device 22, the in-vehicle external sensor 23, the vehicle sensor 24, the storage device 25, and the drive device 26.

The communication device 22 is communicably connected to the vehicle coordinating device 1 via, for example, a wireless communication line 3, a wireless base station 4, an Internet line 5, a wired communication line 6, or the like. The in-vehicle external sensor 23 is, for example, a sensor that detects an object around the vehicle 2. The in-vehicle external sensor 23 includes, for example, a monocular camera, a stereo camera, a laser radar, a millimeter wave radar, an ultrasonic sensor, an infrared sensor, and the like. The vehicle sensor 24 is, for example, a sensor that detects the state of the vehicle 2. The vehicle sensor 24 includes, for example, a wheel speed sensor, an acceleration sensor, an angular velocity sensor, a terminal of a Global Navigation Satellite System (GNSS), and the like.

The storage device 25 is, for example, a nonvolatile memory mounted on the vehicle 2, and stores data including vehicle characteristics used for automatic driving of the vehicle 2, a program, and the like. Note that the vehicle characteristics of the vehicle 2 used for automatic driving of the vehicle 2 may be stored in a nonvolatile memory inside the vehicle control device 21. The drive device 26 includes, for example, various actuators used for automatic driving of the vehicle 2, a motor or an engine that generates a driving force for causing the vehicle 2 to travel, and the like.

The vehicle characteristics of the vehicle 2 used for automatic driving of the vehicle 2 by the vehicle control device 21 include, for example, various parameters of the vehicle 2 such as a tire diameter, cornering power, responsiveness of an actuator, and a turning curvature radius of the vehicle 2. In addition, the vehicle characteristics may include, for example, characteristics of an external recognition function of the in-vehicle external sensor 23 mounted on the vehicle 2 and characteristics of a position estimation function of the vehicle sensor 24 mounted on the vehicle 2.

The vehicle coordinating device 1 can be configured by, for example, a computer, a server, a computer system, or the like including a central processing unit (CPU) (not illustrated), a storage device, a timer, an input/output unit, and the like.

For example, as illustrated in FIG. 1, the vehicle coordinating device 1 includes a communication unit 11, a vehicle characteristic identification unit 12, an identification accuracy estimation unit 13, and an automatic driving coordinating unit 14. Furthermore, the vehicle coordinating device 1 may include, for example, a database 15. Each unit of the vehicle coordinating device 1 illustrated in FIG. 1 is, for example, a functional block representing a function of the vehicle coordinating device 1 realized by executing a program stored in a storage device by a CPU.

The vehicle coordinating device 1 may be constituted by a plurality of devices installed in different places, and units illustrated in FIG. 1 may be divided into different devices and provided. Note that some or all of the vehicle coordinating device 1 can be replaced with, for example, a dedicated device, a general-purpose machine learning machine, a digital signal processor (DSP), a field-programmable gate array (FPGA), a graphics processing unit (GPU), a programmable logic device (PLD), or the like.

The communication unit 11 is communicably connected to one or more vehicle control devices 21 mounted on one or more vehicles 2. More specifically, the communication unit 11 is communicably connected to one or more vehicle control devices 21 via at least the wireless communication line 3. Furthermore, the communication unit 11 may be communicably connected to one or more vehicle control devices 21 via, for example, the communication device 22 mounted on each vehicle 2 and a data communication network including the wireless communication line 3, the wireless base station 4, the Internet line 5, and the wired communication line 6.

The vehicle characteristic identification unit 12 acquires a control command value for automatic driving of the vehicle 2 by the vehicle control device 21 and a traveling locus of the vehicle 2 via the communication unit 11, and identifies the vehicle characteristic used for automatic driving of the vehicle 2. For example, the vehicle characteristic identification unit 12 identifies the vehicle characteristic of the vehicle 2 that has traveled in a predetermined identification area IA under the control of the vehicle control device 21. The identification area IA is, for example, an area between a standby area WA in which one or more vehicles 2 are on standby and a mobility area MA in which one or more vehicles 2 provide mobility services by automatic driving.

The identification area IA includes, for example, a first straight portion IA1, a second straight portion IA2, and a bent portion IA3. The first straight portion IA1 is connected to the standby area WA and linearly extends. The second straight portion IA2 extends in a direction orthogonal to or intersecting with the first straight portion IA1 and is connected to the mobility area MA. The bent portion IA3 connects the first straight portion IA1 and the second straight portion IA2. The bent portion IA3 may be bent at a predetermined angle or may be smoothly curved. In addition, the identification area IA may include only the straight portion.

In the identification area IA, for example, one or more external sensors ES are installed. The external sensor ES detects a position, an attitude, a moving direction, a speed, and the like of the vehicle 2 traveling in the identification area IA. As the external sensor ES, for example, a monocular camera, a stereo camera, a laser radar, a millimeter wave radar, or the like can be used.

The communication unit 11 of the vehicle coordinating device 1 is communicably connected to the external sensor ES installed in the identification area IA via, for example, the wireless communication line 3, the wireless base station 4, the Internet line 5, the wired communication line 6, and the like. In this case, the vehicle characteristic identification unit 12 of the vehicle coordinating device 1 calculates the traveling locus of the vehicle 2 based on, for example, the detection result of the vehicle 2 by the external sensor ES in the identification area IA acquired via the communication unit 11.

For example, the reference path RP may be displayed in the identification area IA. The reference path RP is, for example, a white line including a straight line and a curve drawn on the road surface of the identification area IA, or a straight line and a curve projected by a projector on the road surface of the identification area IA. When the reference path RP is used to identify the vehicle characteristic of the vehicle 2, the vehicle characteristic identification unit 12 causes the vehicle control device 21 to cause the vehicle 2 to travel along the reference path RP displayed in the identification area and detected by the in-vehicle external sensor 23 to identify the vehicle characteristic.

In addition, for example, the vehicle characteristic identification unit 12 may acquire a detection result of the object D such as a dummy doll installed in the identification area IA by the in-vehicle external sensor 23 from the vehicle control device 21 via the communication device 22 to identify the object detection function by the in-vehicle external sensor 23. In addition, for example, the vehicle characteristic identification unit 12 may transmit a control command value in the identification area IA to the vehicle control device 21 via the communication unit 11, and cause the vehicle 2 to travel in the identification area IA by the vehicle control device 21.

The identification accuracy estimation unit 13 estimates the identification accuracy of the vehicle characteristic by the vehicle characteristic identification unit 12. More specifically, for example, the vehicle characteristic identification unit 12 executes identification of the vehicle characteristic of the vehicle 2 a plurality of times. The identification accuracy estimation unit 13 estimates the identification accuracy of the vehicle characteristic based on, for example, identification results of a plurality of vehicle characteristics obtained by a plurality of times of identification by the vehicle characteristic identification unit 12. More specifically, the identification accuracy estimation unit 13 calculates a variance value from, for example, identification results of a plurality of vehicle characteristics, and uses the calculated variance value as the identification accuracy.

The automatic driving coordinating unit 14 coordinates the automatic driving of the vehicle 2 based on the identification accuracy estimated by the identification accuracy estimation unit 13. For example, the automatic driving coordinating unit 14 transmits the vehicle characteristic in which the identification accuracy estimated by the identification accuracy estimation unit 13 is higher than a threshold to the vehicle control device 21 via the communication unit 11, and updates the vehicle characteristic stored in the vehicle control device 21 or the storage device 25.

For example, the automatic driving coordinating unit 14 sets the restriction of the automatic driving by the vehicle control device 21 according to the identification accuracy estimated by the identification accuracy estimation unit 13. In addition, for example, the automatic driving coordinating unit 14 preferentially operates the vehicle 2 having higher identification accuracy estimated by the identification accuracy estimation unit 13 among the plurality of vehicles 2.

The database 15 stores the vehicle characteristics identified by the vehicle characteristic identification unit 12 and the identification accuracy estimated by the identification accuracy estimation unit 13. The database 15 includes, for example, a nonvolatile memory including a ROM, a flash memory, a magnetic storage device, and the like.

Figure 3:
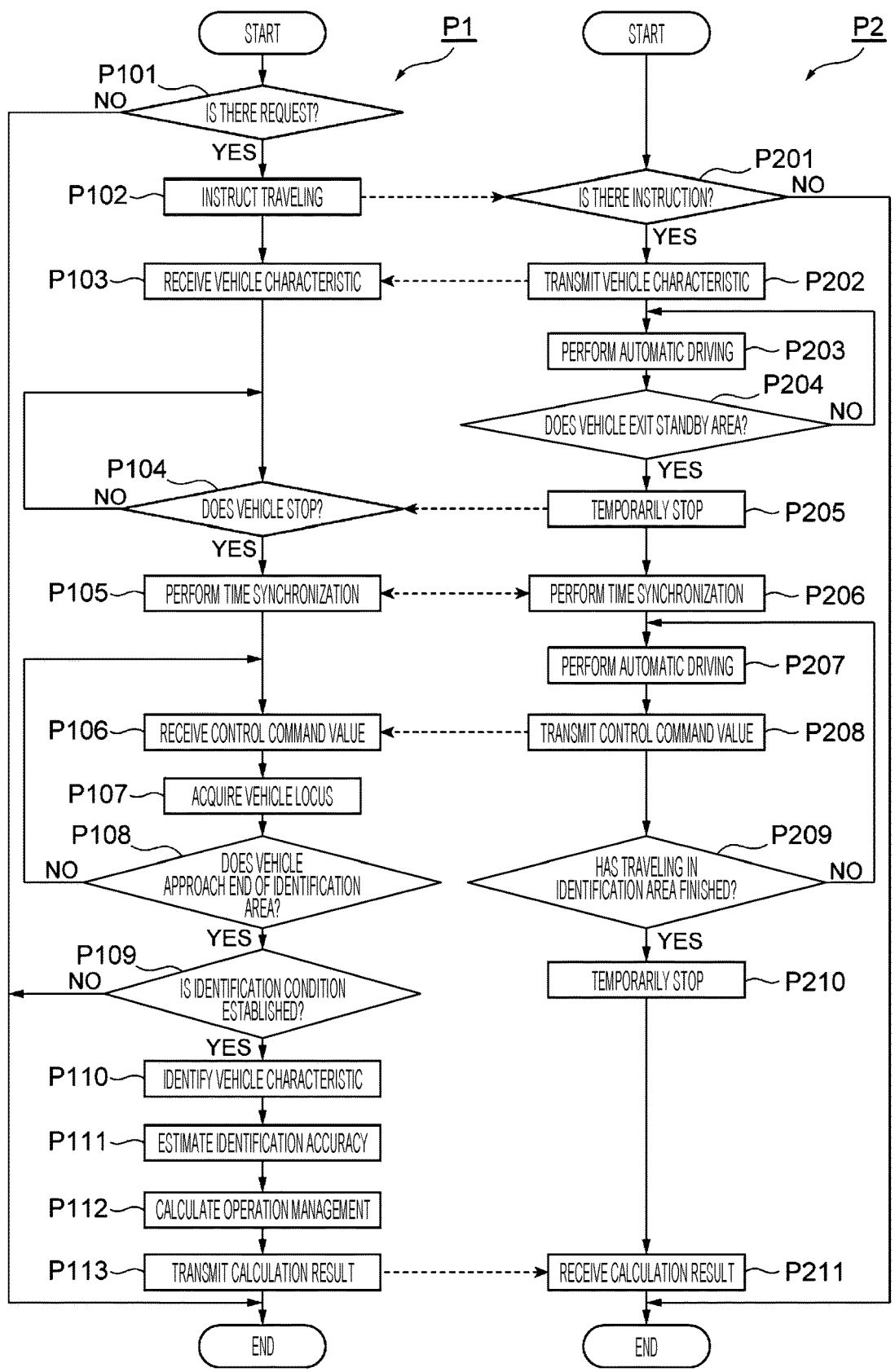
FIG. 3 is a flowchart illustrating a flow of a process by the vehicle coordinating device of FIG. 1.

FIG. 3 is a flowchart illustrating a flow of a process of the vehicle coordinating device 1 of the present embodiment and the vehicle control device 21 mounted on the vehicle 2. Note that, in FIG. 3, a flowchart on the left side illustrates a flow of a process P1 by the vehicle coordinating device 1, and a flowchart on the right side illustrates a flow of a process P2 by the vehicle control device 21 mounted on the vehicle 2.

When starting the process P1 illustrated in FIG. 3, the vehicle coordinating device 1 executes, for example, a process P101 of determining whether there is a request for a mobility service. More specifically, a user of the mobility service transmits a request for the mobility service to the vehicle coordinating device 1 through, for example, an application of an information terminal connected to the Internet line 5. The vehicle coordinating device 1 receives the request for the mobility service via the communication unit 11.

In this process P101, the vehicle coordinating device 1 determines, for example, whether there is the request for mobility service by the automatic driving coordinating unit 14. More specifically, when the communication unit 11 has not received the request for the mobility service, the automatic driving coordinating unit 14 determines that there is no request (NO), and ends the process P1 illustrated in FIG. 3. Meanwhile, when the communication unit 11 receives the request for the mobility service, the automatic driving coordinating unit 14 determines that there is a request (YES) and executes a travel instruction process P102.

In this process P102, the automatic driving coordinating unit 14 of the vehicle coordinating device 1 transmits a traveling instruction to the vehicle control device 21 of the vehicle 2 via the communication unit 11, for example. At this time, the automatic driving coordinating unit 14 refers to, for example, the identification accuracy of the plurality of vehicles 2 stored in the database 15, and transmits the traveling instruction to the vehicle 2 having the highest identification accuracy among the plurality of vehicles 2 waiting in the standby area WA illustrated in FIG. 2 to operate preferentially. Thereafter, the vehicle coordinating device 1 executes, for example, a process P103 of receiving the vehicle characteristics of the vehicle 2.

Meanwhile, when starting the process P2 illustrated in FIG. 3, the vehicle control device 21 mounted on each vehicle 2 executes, for example, a process P201 of determining the presence or absence of the traveling instruction from the vehicle coordinating device 1. In this process P201, when determining that the vehicle control device 21 has not received the traveling instruction from the vehicle coordinating device 1 via the communication device 22 (NO), the vehicle control device ends the process P2 illustrated in FIG. 3. Meanwhile, when determining that the traveling instruction has been received from the vehicle coordinating device 1 via the communication device 22 (YES) in this process P201, the vehicle control device 21 executes a process P202 of transmitting the vehicle characteristics of the vehicle 2 stored in the vehicle control device 21 or the storage device 25.

In this process P202, the vehicle control device 21 transmits the vehicle characteristics of the vehicle 2 to the vehicle coordinating device 1 via, for example, the communication device 22, the wireless communication line 3, the wireless base station 4, the Internet line 5, the wired communication line 6, and the like. Meanwhile, in the above-described process P103, the vehicle coordinating device 1 receives the vehicle characteristic of the vehicle 2 transmitted from the vehicle control device 21 via the communication unit 11 by the vehicle characteristic identification unit 12, for example. In this process P103, the vehicle coordinating device 1 may acquire the vehicle characteristics of the vehicle 2 stored in the database 15.

In addition, the vehicle control device 21 that has completed the transmission of the vehicle characteristics in the process P202 described above executes an automatic driving process P203 for controlling the drive device 26 based on the detection results of the in-vehicle external sensor 23 and the vehicle sensor 24 to cause the vehicle 2 to autonomously travel and exit from the standby area WA. In addition, the vehicle control device 21 executing the automatic driving process P203 executes a process P204 of determining whether the vehicle 2 exits the standby area WA based on the detection results of the in-vehicle external sensor 23 and the vehicle sensor 24.

In this process P204, when it is determined that the vehicle 2 does not exit the standby area WA (NO), the vehicle control device 21 continues the automatic driving process P203, and when it is determined that the vehicle 2 exits the standby area WA (YES), a temporary stop process P205 is executed. In this process P205, for example, the vehicle control device 21 controls the drive device 26 to stop the vehicle 2, and transmits a stop signal indicating that the vehicle 2 has exited the standby area WA and stopped to the vehicle coordinating device 1 via the communication device 22. Thereafter, the vehicle control device 21 executes a time synchronization process P206.

Meanwhile, after acquiring the vehicle characteristics of the vehicle 2 from the vehicle control device 21 or the database 15 in the above-described process P103, the vehicle coordinating device 1 executes a process P104 of determining whether or not the vehicle 2 exits the standby area WA and stops. In this process P104, the vehicle coordinating device 1 determines, for example, whether or not a stop signal has been received from the vehicle coordinating device 1 via the communication unit 11 by the automatic driving coordinating unit 14. For example, when it is determined that the automatic driving coordinating unit 14 has not received the stop signal, the vehicle coordinating device 1 repeats this process P104, and when it is determined that the automatic driving coordinating unit 14 has received the stop signal (YES), the vehicle coordinating device 1 executes a time synchronization process P105.

In the time synchronization processes P105 and P206, the vehicle characteristic identification unit 12 of the vehicle coordinating device 1 and the vehicle control device 21 of the vehicle 2 establish communication with each other and perform time synchronization. As a result, in the identification processing of the vehicle characteristic described later, the relationship between the time series of the control command value of the vehicle control device 21 and the time series of the traveling locus of the vehicle 2 becomes clear, and the identification of the vehicle characteristic becomes easy.

Thereafter, the vehicle control device 21 executes an automatic driving process P207 for causing the vehicle 2 to autonomously travel in the identification area IA and a process P208 for transmitting the control command value calculated in the process P207 to the vehicle coordinating device 1. Meanwhile, the vehicle coordinating device 1 executes a process P106 of receiving the control command value transmitted from the vehicle control device 21 via the communication unit 11 by, for example, the vehicle characteristic identification unit 12.

The control command value of the vehicle control device 21 includes, for example, upper command values such as a vehicle speed command value and a steering angle command value, and lower command values such as a throttle opening, a brake pressure, and a pinion angle. For example, in the process P106 described above, the vehicle coordinating device 1 acquires the control command value of the vehicle control device 21 and the time when the control command value is output. That is, the vehicle coordinating device 1 acquires, for example, the time series of the control command value of the vehicle control device 21 in the above-described process P106.

Since the vehicle control device 21 normally controls each unit of the vehicle 2 such as the drive device 26 at a constant cycle in the automatic driving process P207 described above, the control command value is also calculated at a constant cycle. Therefore, the vehicle coordinating device 1 periodically acquires a control command value for one cycle or several cycles from the vehicle control device 21 in the above-described process P106, for example. In addition, the vehicle coordinating device 1 may acquire the control command value of the vehicle control device 21, for example, when the vehicle 2 reaches a plurality of reference points BM1, BM2, and BM3 set in advance in the identification area IA.

More specifically, for example, when the vehicle 2 reaches the reference point BM2, the vehicle control device 21 executes the above-described process P208 and transmits the time series of the control command value from the reference point BM1 to the reference point BM2. In this case, for example, the vehicle coordinating device 1 receives the time series of the control command value from the reference point BM1 to the reference point BM2 transmitted from the vehicle control device 21 in the process P106 described above.

In addition, for example, the vehicle control device 21 may receive the control command value in the identification area IA transmitted by the vehicle characteristic identification unit 12 of the vehicle coordinating device 1 via the communication unit 11, and cause the vehicle 2 to autonomously travel using the control command value received from the vehicle coordinating device 1 in the automatic driving process P207. Further, for example, in the automatic driving process P207, the vehicle control device 21 may cause the vehicle 2 to travel along the reference path RP displayed in the identification area IA and detected by the in-vehicle external sensor 23.

In addition, for example, after the above-described processes P207 and P208, the vehicle control device 21 executes a process P209 of determining whether or not the vehicle 2 has finished traveling in the identification area IA based on the detection results of the in-vehicle external sensor 23 and the vehicle sensor 24. In this process P209, when determining that the vehicle 2 has not finished traveling in the identification area IA (NO), the vehicle control device 21 repeatedly executes the above-described processes P207 and P208. Meanwhile, when determining that the vehicle 2 has finished traveling in the identification area IA (YES) in this process P209, the vehicle control device 21 executes a temporary stop process P210 for stopping the vehicle 2 at the end of the identification area IA.

In addition, the vehicle coordinating device 1 executes a process P107 of acquiring the traveling locus of the vehicle 2 after the process P106 of receiving the control command value described above. In this process P107, the vehicle characteristic identification unit 12 of the vehicle coordinating device 1 acquires the detection result of the vehicle 2 by the one or more external sensors ES installed in the identification area IA via the communication unit 11, for example, as described above, and acquires the traveling locus of the vehicle 2 based on the detection result. Here, by calculating the traveling locus of the vehicle 2 based on the detection results of the vehicle 2 by the plurality of external sensors ES, the estimation accuracy of the traveling locus can be improved.

In the automatic driving process P207 described above, as described above, the vehicle control device 21 may cause the vehicle 2 to travel along the reference path RP displayed in the identification area IA and detected by the in-vehicle external sensor 23. In this case, in the process P208 described above, the vehicle characteristic identification unit 12 of the vehicle coordinating device 1 receives the control command value from the vehicle control device 21 that controls the vehicle 2 so as to cause the vehicle 2 to travel along the reference path RP. In addition, for example, in the process P107 described above, the vehicle characteristic identification unit 12 may acquire information of the reference path RP stored in advance in the database 15 as the traveling locus of the vehicle 2.

After completion of the above-described process P107 of acquiring the vehicle locus, the vehicle coordinating device 1 executes a process P108 of determining whether the vehicle 2 approaches the end of the identification area IA. In this process P108, the vehicle characteristic identification unit 12 determines whether the vehicle 2 approaches the end of the identification area IA based on, for example, the position information of the vehicle 2 calculated in the above-described vehicle locus acquisition process P107 and the position information of the end of the identification area IA.

More specifically, in this process P108, the vehicle characteristic identification unit 12 calculates, for example, a distance from the vehicle 2 to the end of the identification area IA, and determines that the vehicle 2 does not approach (NO) when the calculated distance is longer than a predetermined distance. In this case, vehicle characteristic identification unit 12 repeatedly executes processes P107 to P108 described above. Meanwhile, when the calculated distance is equal to or less than the predetermined distance, the vehicle characteristic identification unit 12 executes a process P109 of determining that the vehicle approaches (YES) and determining whether the identification condition is established.

In the process P108 described above, the predetermined distance serving as the threshold for determining whether the vehicle 2 approaches the end of the identification area IA is not particularly limited. For example, the predetermined distance is set to a distance at which the vehicle 2 traveling in the identification area IA can safely stop at the end of the identification area IA. Specifically, this predetermined distance can be set to, for example, a distance of about 10 [m] to 30 [m].

When starting the process P109 of determining whether or not the identification condition is established, the vehicle coordinating device 1 confirms, for example, whether or not the control command value of the vehicle control device 21 is successfully received and whether or not the traveling locus of the vehicle 2 is successfully acquired by the vehicle characteristic identification unit 12. For example, when at least one of the reception of the control command value and the acquisition of the traveling locus fails, the vehicle characteristic identification unit 12 determines that the identification condition is not established (NO), and ends the process P1 illustrated in FIG. 3. In this case, the vehicle control device 21 of the vehicle 2 ends the process P2 illustrated in FIG. 3 without receiving a calculation result from the vehicle coordinating device 1 in the calculation result reception process P211.

Meanwhile, for example, when both the reception of the control command value and the acquisition of the traveling locus are successful, the vehicle characteristic identification unit 12 determines that the identification condition is established (YES) and executes a vehicle characteristic identification process P110. In this process P110, the vehicle characteristic identification unit 12 identifies the vehicle characteristic used for the automatic driving of the vehicle 2 by using the control command value of the automatic driving by the vehicle control device 21 acquired in the above-described process P106 and the traveling locus of the vehicle 2 acquired in the above-described process P107.

More specifically, in this process P110, the vehicle characteristic identification unit 12 identifies the responsiveness of the vehicle speed control and the tire diameter of the vehicle 2 based on, for example, the speed control command value and the information of the position and time included in the traveling locus in a section in which the vehicle 2 performs only the movement in a front-rear direction. In addition, the vehicle characteristic identification unit 12 identifies the cornering power and the turning curvature radius, for example, in a section in which the speed of the vehicle 2 is constant and the lateral movement is performed, based on the control command value of the steering angle and the information of the position and time included in the traveling locus. Since a known method can be applied as a method for identifying cornering power and a turning curvature radius, the description thereof will be omitted.

Here, the vehicle characteristic identification unit 12 may identify, for example, an object detection function by the in-vehicle external sensor 23 or a detection function of the position of the vehicle 2 by the vehicle sensor 24. In this case, for example, in the process P106 described above, the vehicle characteristic identification unit 12 acquires the detection result of the object D installed in the identification area IA by the in-vehicle external sensor 23 and the detection result of the position of the vehicle 2 by the vehicle sensor 24 from the vehicle control device 21 via the communication unit 11. Further, the vehicle characteristic identification unit 12 acquires, for example, an absolute position of the object D recorded in advance in the nonvolatile memory of the vehicle coordinating device 1.

Then, in the vehicle characteristic identification process P110 described above, the vehicle characteristic identification unit 12 identifies the object detection function by the in-vehicle external sensor 23 based on, for example, the absolute position of the object D, the information on the position and time included in the traveling locus of the vehicle 2, and the detection result of the in-vehicle external sensor 23. In addition, the vehicle characteristic identification unit 12 identifies the position detection function of the vehicle 2 by the vehicle sensor 24 based on, for example, information on the position and time included in the traveling locus of the vehicle 2 and the detection result of the position of the vehicle 2 by the vehicle sensor 24.

After the vehicle characteristic identification process P110 ends, the vehicle coordinating device 1 executes an identification accuracy estimation process P111. In this process P111, the identification accuracy estimation unit 13 of the vehicle coordinating device 1 estimates the identification accuracy of the vehicle characteristics by the vehicle characteristic identification unit 12. More specifically, for example, as described above, the identification accuracy estimation unit 13 calculates, as the identification accuracy, a variance value of identification results of a plurality of vehicle characteristics obtained by a plurality of times of identification by the vehicle characteristic identification unit 12.

Further, in this process P111, the identification accuracy estimation unit 13 may calculate, for example, the object detection accuracy of the in-vehicle external sensor 23 and the position detection accuracy of the vehicle sensor 24. In this case, the identification accuracy estimation unit 13 calculates the object detection accuracy of the in-vehicle external sensor 23 based on, for example, the absolute position of the object D, the information on the position and time included in the traveling locus of the vehicle 2, and the detection result of the in-vehicle external sensor 23. In addition, the identification accuracy estimation unit 13 calculates the position detection accuracy of the vehicle sensor 24 based on, for example, information on the position and time included in the traveling locus of the vehicle 2 and the detection result of the position of the vehicle 2 by the vehicle sensor 24.

After the identification accuracy estimation process P111 ends, the vehicle coordinating device 1 executes an operation management calculation process P112. In this process P112, the automatic driving coordinating unit 14 of the vehicle coordinating device 1 controls the automatic driving of the vehicle 2 based on the identification accuracy of the vehicle characteristic estimated by the identification accuracy estimation unit 13. More specifically, the automatic driving coordinating unit 14 sets the restriction on the path to the destination based on, for example, the identification accuracy of the vehicle characteristic of the vehicle 2.

Figure 4:
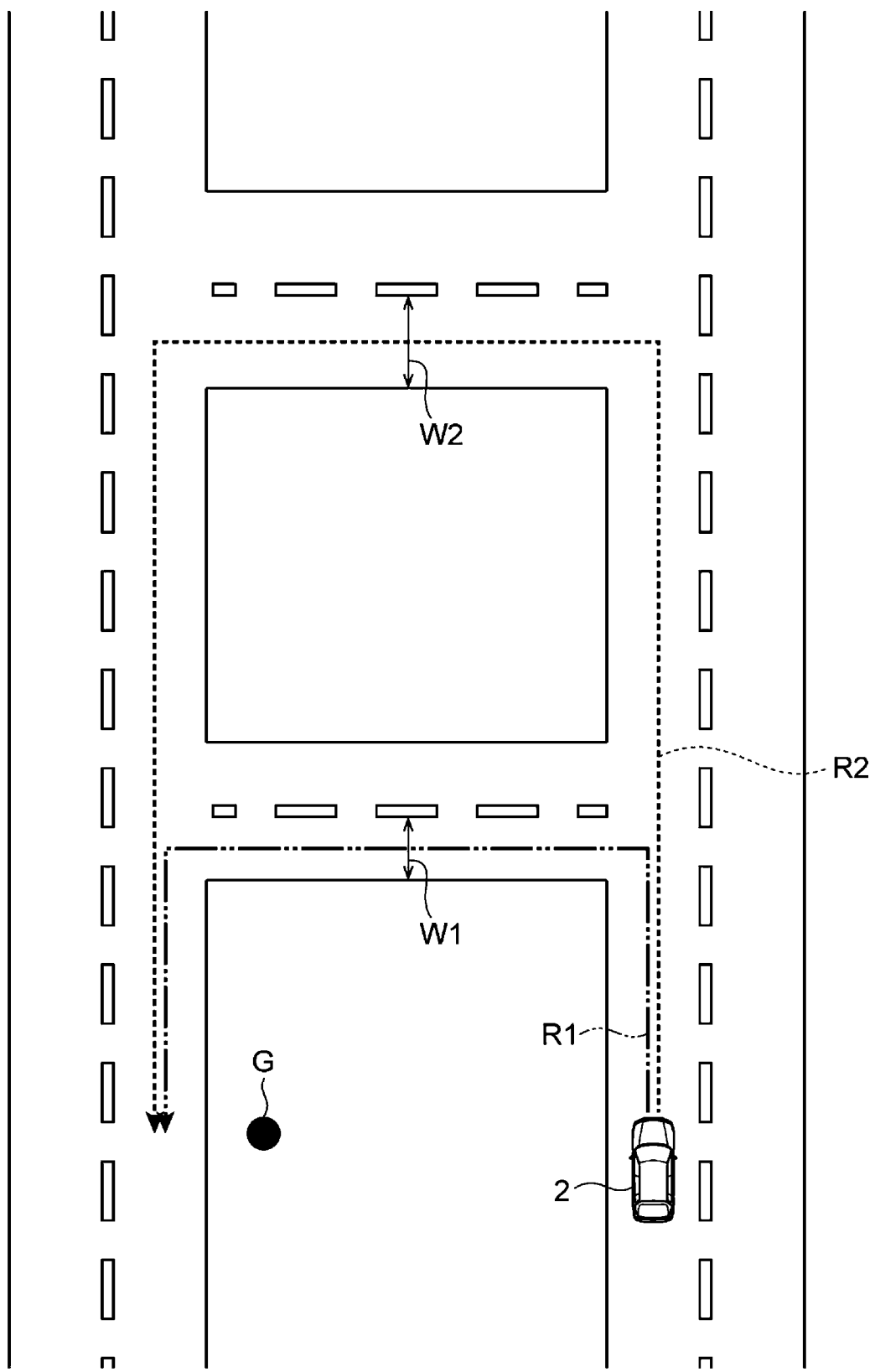
FIG. 4 is a plan view illustrating an example of restriction of automatic driving of a vehicle by the vehicle coordinating device of FIG. 1.

FIG. 4 is a plan view illustrating an example of the restriction on the automatic driving of the vehicle 2 set by the automatic driving coordinating unit 14. For example, the automatic driving coordinating unit 14 sets the restriction of a road width in a path to a destination G based on the identification accuracy of the vehicle characteristic of the vehicle 2. More specifically, for example, the automatic driving coordinating unit 14 sets the restriction of the road width to a relatively narrow road width W1 for the vehicle 2 in which the identification accuracy of the vehicle characteristic is equal to or greater than a predetermined threshold value. Furthermore, for example, the automatic driving coordinating unit 14 sets the restriction of the road width to a relatively wide road width W2 for the vehicle 2 in which the identification accuracy of the vehicle characteristic is lower than a predetermined threshold value.

As a result, the vehicle coordinating device 1 can coordinate the automatic driving of the vehicle 2 so that the vehicle 2 having high identification accuracy of the vehicle characteristics travels on the shortest path R1 to the destination G including the narrow road width W1. In addition, the vehicle coordinating device 1 can coordinate the automatic driving of the vehicle 2 such that the vehicle 2 having low identification accuracy of the vehicle characteristics travels on the path R2 having a wider road width W2 while avoiding the path R1 including the narrow road width W1.

Note that the automatic driving coordinating unit 14 may calculate the optimum paths R1 and R2 for each vehicle 2 based on the restriction set according to the identification accuracy of the vehicle characteristics of the vehicle 2 in the operation management calculation process P112 described above. Furthermore, in the case of the vehicle 2 used for last one mile mobility, the automatic driving coordinating unit 14 may change the destination according to the identification accuracy of the vehicle characteristic. For example, the vehicle 2 having low identification accuracy of vehicle characteristics is difficult to perform automatic driving in units of several centimeters. Therefore, for example, when a sufficient space cannot be secured around the destination, the automatic driving coordinating unit 14 sets a point where there is a wider space around the destination as a new destination.

After the operation management calculation process P112 ends, the vehicle coordinating device 1 executes a calculation result transmission process P113. In this process, the vehicle characteristic identification unit 12 of the vehicle coordinating device 1 transmits the identified vehicle characteristic of the vehicle 2 and the estimated identification accuracy to the vehicle control device 21 of the vehicle 2 via the communication unit 11, for example. In addition, the vehicle control device 21 of the vehicle 2 executes, for example, a process P211 of receiving the vehicle characteristics and the identification accuracy transmitted from the vehicle coordinating device 1 via the communication device 22. Note that the vehicle coordinating device 1 may transmit the target path calculated according to the identification accuracy of the vehicle 2 to the vehicle control device 21 of the vehicle 2 in the process P113 described above.

Note that the automatic driving coordinating unit 14 may transmit the vehicle characteristic in which the identification accuracy estimated by the identification accuracy estimation unit 13 is higher than the threshold value to the vehicle control device 21 via the communication unit 11, for example, in the above-described process P113. In this case, in the process P211 described above, the vehicle characteristics stored in the vehicle control device 21 may be updated. After completion of these processes P113 and P211, the vehicle coordinating device 1 and the vehicle control device 21 of the vehicle 2 end the processes P1 and P2 illustrated in FIG. 3. Thereafter, under the control of the vehicle control device 21, the vehicle 2 starts automatic driving in the mobility area MA and provides mobility services such as on-demand traffic and last one mile mobility.

For example, after providing a service in the mobility area MA, the vehicle 2 passes through the identification area IA and returns to the standby area WA under the control of the vehicle control device 21. At this time, the above-described processes P1 and P2 may be executed by the vehicle coordinating device 1 and the vehicle control device 21 of the vehicle 2. In addition, for example, the vehicle coordinating device 1 may communicate with the vehicle control device 21 of the vehicle 2 that has returned to the standby area WA, and transmit the newly identified vehicle characteristics and the identification accuracy thereof from the vehicle coordinating device 1 to the vehicle control device 21. In addition, the vehicle coordinating device 1 may store newly identified vehicle characteristics and identification accuracy thereof in the database 15, for example.

Note that, in the example illustrated in FIG. 3, the vehicle coordinating device 1 receives the vehicle characteristics from the vehicle 2 in process P103 before the vehicle 2 enters the identification area IA, but may acquire the vehicle characteristics of the vehicle 2 after the vehicle 2 enters the identification area IA. In this case, for example, the vehicle coordinating device 1 confirms whether or not the vehicle characteristics of the vehicle 2 have been acquired in the above-described process P105, and receives the vehicle characteristics from the vehicle 2 or acquires the vehicle characteristics stored in the database 15 when the vehicle characteristics have not been acquired. Thereafter, the vehicle coordinating device 1 can execute the above-described process P106.

Hereinafter, the operation of the vehicle coordinating device 1 of the present embodiment will be described.

The vehicle coordinating device 1 of the present embodiment is a device that controls automatic driving of the vehicle 2 by the vehicle control device 21 mounted on the vehicle 2. The vehicle coordinating device 1 includes the communication unit 11 communicably connected to the vehicle control device 21, and the vehicle characteristic identification unit 12 that acquires the control command value for automatic driving and the traveling locus of the vehicle 2 from the vehicle control device 21 via the communication unit 11 and identifies the vehicle characteristic used for the automatic driving. In addition, the vehicle coordinating device 1 includes the identification accuracy estimation unit 13 that estimates the identification accuracy of the vehicle characteristics by the vehicle characteristic identification unit 12, and the automatic driving coordinating unit 14 that controls the automatic driving of the vehicle 2 based on the identification accuracy estimated by the identification accuracy estimation unit 13.

With such a configuration, the vehicle coordinating device 1 according to the present embodiment can improve the accuracy of following the target path of the vehicle 2, and can improve an operation utilization rate of the vehicle 2 in on-demand traffic and last one mile mobility. That is, the vehicle characteristics, which are parameters used for automatic driving of the vehicle 2 by the vehicle control device 21, can be updated at any time, and a temporal change in the vehicle characteristics can be reflected in the automatic driving of the vehicle 2. In other words, in the control of the vehicle 2, the feedforward term is updated more than the feedback term, so that the accuracy of following the target path during the automatic driving of the vehicle 2 can be improved.

In addition, according to the vehicle coordinating device 1 of the present embodiment, by identifying the vehicle characteristics of the vehicle 2 and estimating the identification accuracy, it is possible to detect a decrease in position detection accuracy by the vehicle sensor 24 mounted on the vehicle 2 and a decrease in the following accuracy due to a change in the vehicle characteristics with time. Therefore, for example, when there is a service request from the user of the mobility service, the vehicle coordinating device 1 of the present embodiment can select the vehicle 2 having higher identification accuracy of the vehicle characteristic from the plurality of vehicles 2 waiting in the standby area WA and preferentially operate the vehicle 2. As a result, the accuracy of following the target path by the vehicle 2 that provides the mobility service is improved, and the operation utilization rate of the entire mobility service provided by the plurality of vehicles 2 can be improved.

In addition, according to the vehicle coordinating device 1 of the present embodiment, it is possible to select and operate the vehicle 2 having the identification accuracy of the vehicle characteristic according to the service request by the user of the mobility service. More specifically, for example, it is assumed that the mobility area MA in which the mobility service by the vehicle 2 is provided is left-hand traffic. In this case, when the path to the destination based on the service request is only straight and left turn, the accuracy of following the target path requested to the vehicle 2 is relatively low. Meanwhile, when the path to the destination includes a narrow path or a right turn, the accuracy of following the target path required for the vehicle 2 is relatively high. As described above, according to the vehicle coordinating device 1 of the present embodiment, the operation utilization rate of the entire mobility service provided by the plurality of vehicles 2 can be improved by selecting and operating the vehicle 2 having the identification accuracy of the vehicle characteristic according to the required accuracy of following the target path.

In addition, in the vehicle coordinating device 1 of the present embodiment, the vehicle characteristic identification unit 12 identifies the vehicle characteristic of the vehicle 2 that has traveled in the predetermined identification area IA under the control of the vehicle control device 21. With such a configuration, the vehicle coordinating device 1 of the present embodiment can cause the vehicle 2 traveling in the identification area IA by automatic driving under the control of the vehicle control device 21 to perform a desired operation according to the shape of the identification area IA, such as straight traveling, acceleration, deceleration, turning, turning, right/left turning, and the like. Therefore, according to the vehicle coordinating device 1 of the present embodiment, the identification accuracy of the vehicle characteristics of the vehicle 2 can be improved.

In addition, in the vehicle coordinating device 1 of the present embodiment, the communication unit 11 is communicably connected to the external sensor ES installed in the identification area IA. In addition, the vehicle characteristic identification unit 12 calculates the traveling locus of the vehicle 2 based on the detection result of the vehicle 2 by the external sensor ES acquired via the communication unit 11. With such a configuration, the vehicle coordinating device 1 can accurately calculate the traveling locus of the vehicle 2 traveling in the identification area IA regardless of the position detection accuracy of the vehicle sensor 24 mounted on the vehicle 2.

In the present embodiment, the vehicle control device 21 mounted on the vehicle 2 is connected to the in-vehicle external sensor 23 mounted on the vehicle 2. In addition, in the vehicle coordinating device 1 of the present embodiment, the vehicle characteristic identification unit 12 acquires the detection result of the object D installed in the identification area IA by the in-vehicle external sensor 23 from the vehicle control device 21 via the communication unit 11, and identifies the object detection function by the in-vehicle external sensor 23. With such a configuration, the vehicle coordinating device 1 of the present embodiment can identify the detection characteristic of the in-vehicle external sensor 23 mounted on the vehicle 2 as the vehicle characteristic of the vehicle 2.

In addition, in the vehicle coordinating device 1 of the present embodiment, the vehicle characteristic identification unit 12 transmits the control command value in the identification area IA to the vehicle control device 21 via the communication unit 11, and causes the vehicle 2 to travel in the identification area IA by the vehicle control device 21. With such a configuration, the vehicle coordinating device 1 of the present embodiment can identify the vehicle characteristics of the vehicle 2 based on the control command value transmitted to the vehicle control device 21 and the traveling locus of the vehicle 2 traveling in the identification area IA and estimate the identification accuracy.

In the present embodiment, the vehicle control device 21 mounted on the vehicle 2 is connected to the in-vehicle external sensor 23 mounted on the vehicle 2. Then, in the vehicle coordinating device 1 of the present embodiment, the vehicle characteristic identification unit 12 causes the vehicle control device 21 to cause the vehicle 2 to travel along the reference path RP displayed in the identification area IA and detected by the in-vehicle external sensor 23 to identify the vehicle characteristic.

With such a configuration, the vehicle coordinating device 1 of the present embodiment can identify the vehicle characteristic of the vehicle 2 based on the control command value of the vehicle control device 21 and the reference path RP as the traveling locus of the vehicle 2 without using the external sensor ES installed in the identification area IA. In addition, since the reference path RP includes a straight line and a curved line, it is possible to identify vehicle characteristics in the front-rear direction and the lateral direction of the vehicle 2, and it is possible to improve the accuracy of following the target path of the vehicle 2.

In addition, in the vehicle coordinating device 1 of the present embodiment, the automatic driving coordinating unit 14 transmits the vehicle characteristic in which the identification accuracy estimated by the identification accuracy estimation unit 13 is higher than the threshold to the vehicle control device 21 via the communication unit 11, and updates the vehicle characteristic stored in the vehicle control device 21. With such a configuration, in the automatic driving of the vehicle 2 under the control of the vehicle control device 21, the accuracy of following the target path can be improved.

In addition, in the vehicle coordinating device 1 of the present embodiment, the automatic driving coordinating unit 14 sets the restriction of the automatic driving by the vehicle control device 21 according to the identification accuracy estimated by the identification accuracy estimation unit 13. With such a configuration, the vehicle coordinating device 1 of the present embodiment can improve the safety of the automatic driving of the vehicle 2, perform the optimal coordination according to the identification accuracy of the vehicle characteristic of the vehicle 2, and can improve the operation utilization rate of the entire mobility service provided by the plurality of vehicles 2.

In addition, in the vehicle coordinating device 1 of the present embodiment, the automatic driving coordinating unit 14 preferentially operates a vehicle having higher identification accuracy estimated by the identification accuracy estimation unit 13 among the plurality of vehicles 2. With such a configuration, according to the vehicle coordinating device 1 of the present embodiment, it is possible to improve the accuracy of following the target path by the vehicle 2 that provides the mobility service and to improve the operation utilization rate of the entire mobility service provided by the plurality of vehicles 2.

In addition, the vehicle coordinating device 1 of the present embodiment includes a database 15 that stores vehicle characteristics of the vehicle 2 and identification accuracy thereof. With such a configuration, the vehicle coordinating device 1 can use the vehicle characteristics of the vehicle 2 and the identification accuracy thereof stored in the database 15, and can improve the operation utilization rate of the entire mobility service provided by the plurality of vehicles 2.

As described above, according to the present embodiment, it is possible to provide the vehicle coordinating device 1 capable of improving the accuracy of following the target path of the vehicle 2, and it is possible to improve the operation utilization rate of the entire mobility service provided by the plurality of vehicles 2. Note that the vehicle coordinating device 1 of the present embodiment is not limited to the above-described configuration. Hereinafter, a modification of the vehicle coordinating device 1 of the present embodiment will be described with reference to FIG. 5.

Figure 5:
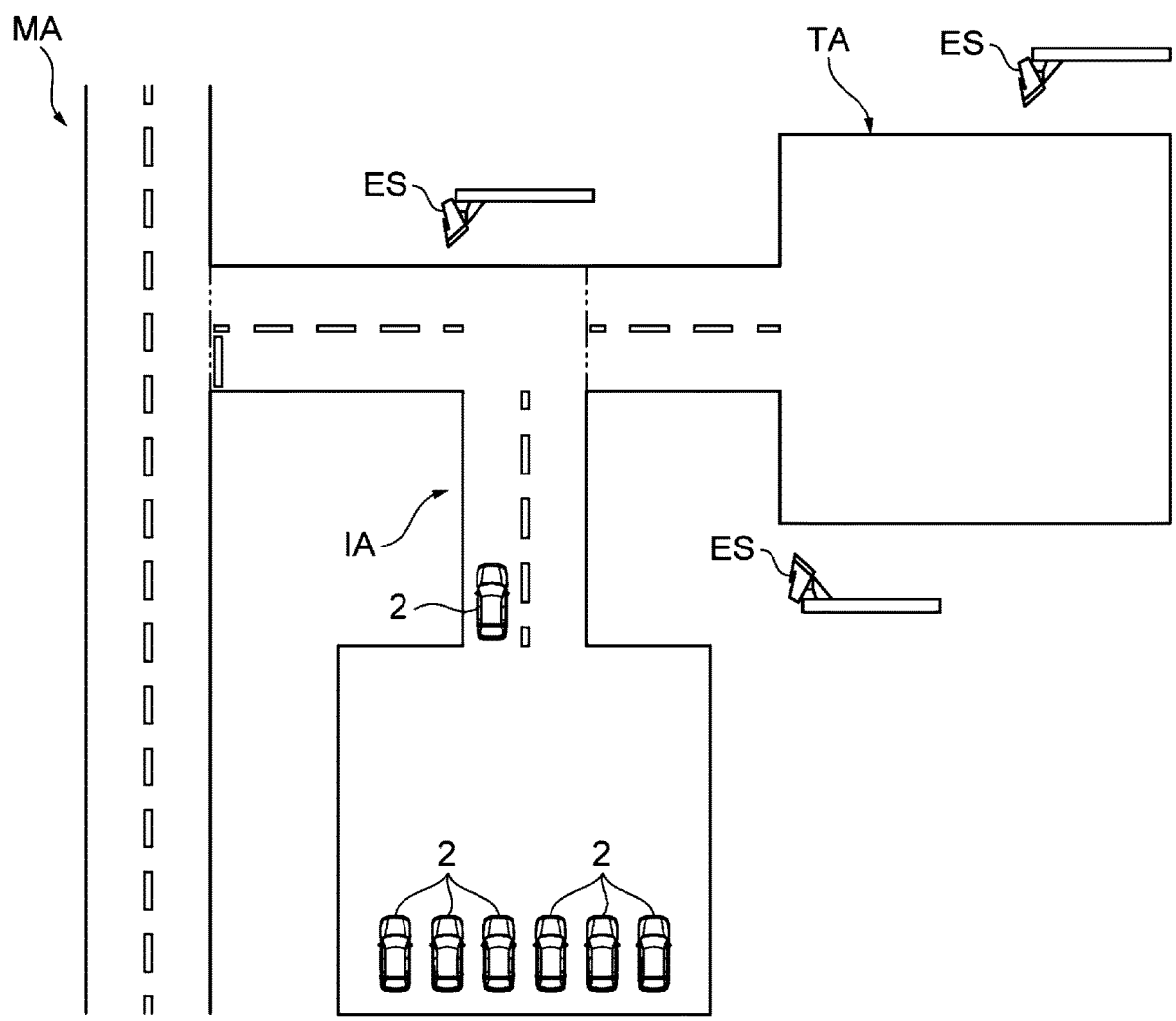
FIG. 5 is a schematic plan view illustrating a modification of the vehicle coordination of FIG. 2 by the vehicle coordinating device of FIG. 1.

FIG. 5 is a schematic plan view illustrating a modification of the vehicle coordination of FIG. 2 by the vehicle coordinating device 1 of FIG. 1. In this modification, the vehicle characteristic identification unit 12 of the vehicle coordinating device 1 identifies the vehicle characteristic of the vehicle 2 that has traveled in the maintenance area TA wider than the identification area IA under the control of the vehicle control device 21. Here, the maintenance area TA has, for example, an area and a shape capable of turning the vehicle 2 with a turning radius larger than the turning of the vehicle 2 in the identification area IA, slalom travel of the vehicle 2, and the like.

For example, the vehicle coordinating device 1 identifies the vehicle characteristics of the vehicle 2 in the identification area IA every time the vehicle 2 travels in the mobility area MA, whereas the vehicle characteristics of the vehicle 2 in the maintenance area TA are identified in a predetermined cycle such as one month or several months. According to the vehicle coordinating device 1 according to this modification, the identification of the vehicle characteristics of the vehicle 2 can be performed more comprehensively, and the identification accuracy of the vehicle characteristics can be improved.

Therefore, according to the vehicle coordinating device 1 according to this modification, it is possible to further improve the accuracy of following the target path by the vehicle 2 that provides the mobility service and to further improve the operation utilization rate of the entire mobility service provided by the plurality of vehicles 2.

Second Embodiment

Figure 6:
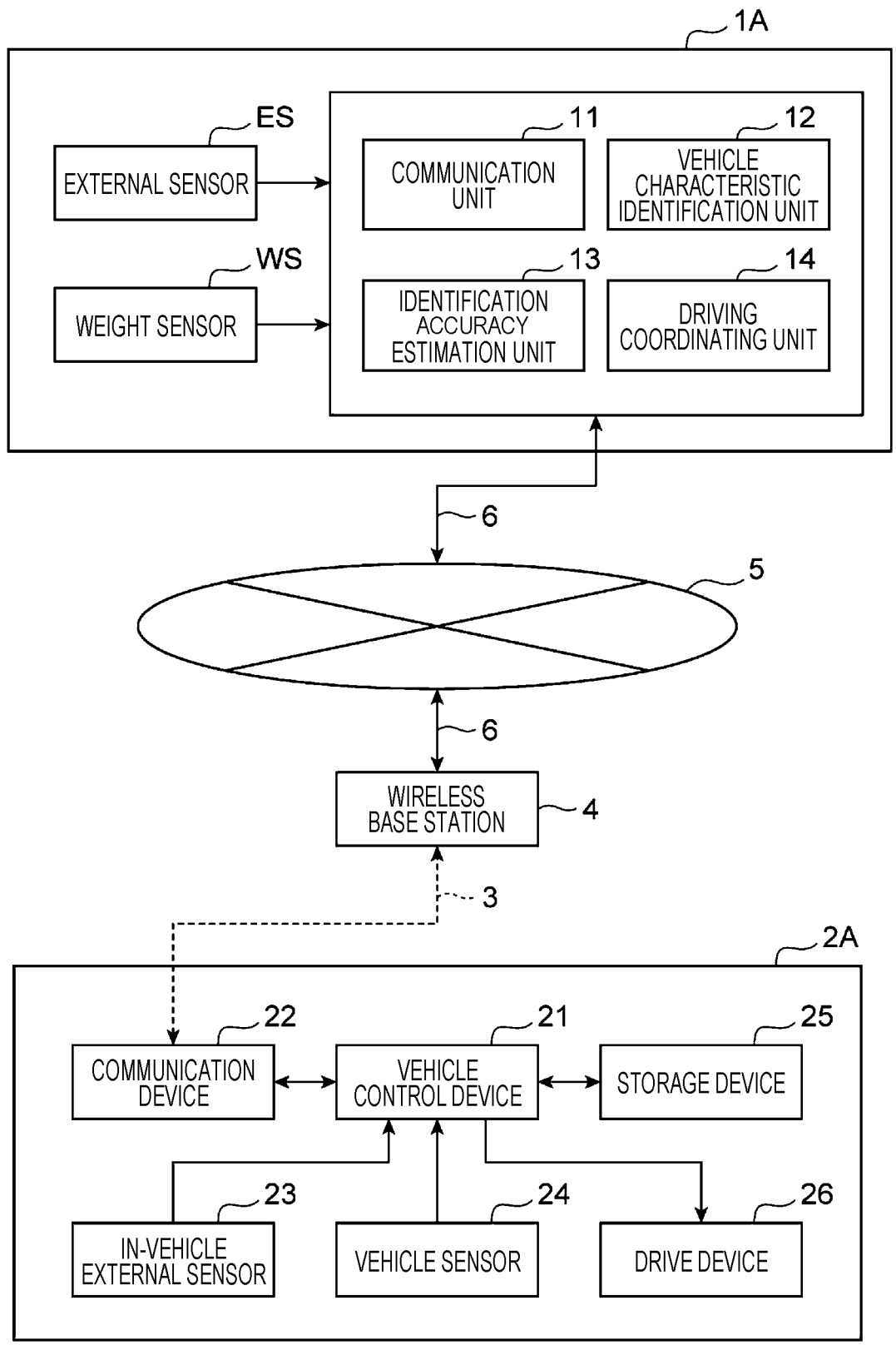
FIG. 6 is a block diagram illustrating a second embodiment of the vehicle coordinating device according to the present disclosure.
Figure 7:
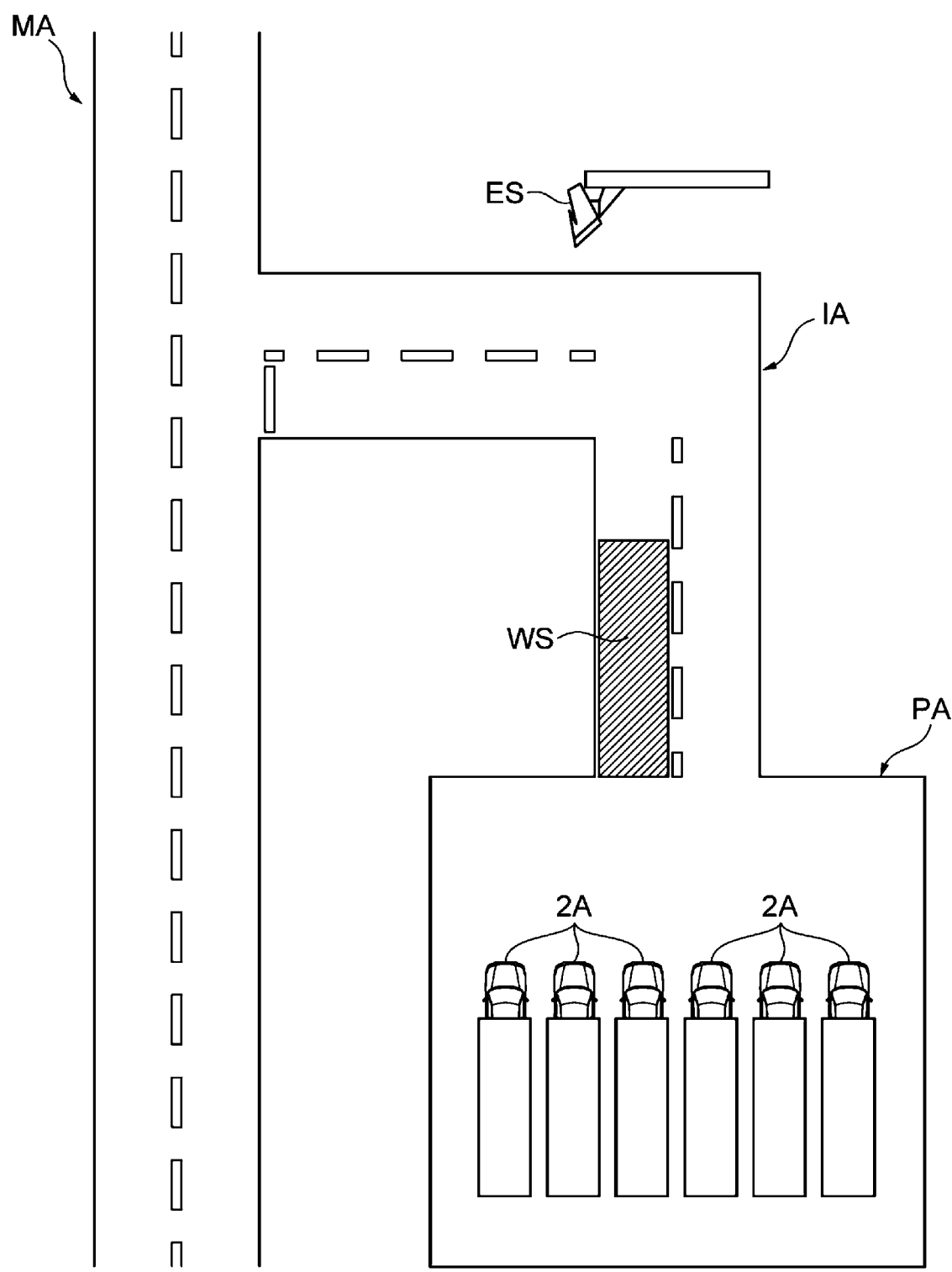
FIG. 7 is a schematic plan view illustrating an example of vehicle coordination by the vehicle coordinating device of FIG. 6.

Hereinafter, a second embodiment of a vehicle coordinating device according to the present disclosure will be described with reference to FIGS. 6 to 8. FIG. 6 is a block diagram illustrating a second embodiment of the vehicle coordinating device according to the present disclosure. FIG. 7 is a schematic plan view for explaining a process by a vehicle coordinating device 1A of FIG. 6.

In the first embodiment described above, the vehicle coordinating device 1 that controls the automatic driving of the vehicle 2 by the vehicle control device 21 mounted on the vehicle 2 used for on-demand traffic and last one mile mobility has been described. Meanwhile, in the present embodiment, for example, the vehicle coordinating device 1A that coordinates automatic driving of a vehicle 2A such as a large cargo vehicle in which cargo loading and unloading occurs will be described. Note that, in the present embodiment, configurations similar to those of the vehicle coordinating device 1, the vehicle 2, and the identification area IA of the first embodiment described above are denoted by the same reference numerals as those of the first embodiment described above, and description thereof is omitted.

The vehicle coordinating device 1A of the present embodiment includes, for example, an external sensor ES and a weight sensor WS installed in the identification area IA. In the vehicle coordinating device 1A, the communication unit 11, the vehicle characteristic identification unit 12, the identification accuracy estimation unit 13, and the automatic driving coordinating unit 14 are configured by one or more computers, servers, or computer systems similarly to the vehicle coordinating device 1 of the first embodiment described above. The external sensor ES and the weight sensor WS are communicably connected to the communication unit 11, the vehicle characteristic identification unit 12, the identification accuracy estimation unit 13, and the automatic driving coordinating unit 14.

For example, as illustrated in FIG. 7, the vehicle 2A loads and unloads cargo in a loading/unloading area PA such as a truck yard, a distribution center, or a warehouse. In addition, after loading and unloading the cargo in the loading/unloading area PA, the vehicle 2A travels in the identification area IA by automatic driving under the control of the vehicle control device 21 between the loading/unloading area PA and the loading/unloading area of the mobility area MA.

The vehicle 2A that has entered the identification area IA from the loading/unloading area PA illustrated in FIG. 7 temporarily stops on the weight sensor WS. The vehicle coordinating device 1A measures the weight of the vehicle 2A by the weight sensor WS. For example, the vehicle coordinating device 1A may measure not only the entire weight of the vehicle 2A but also a load acting on each wheel of the vehicle 2A.

The vehicle coordinating device 1A of the present embodiment uses the weight of the vehicle 2A measured by the weight sensor WS of the identification area IA and the load acting on each wheel for identification of the vehicle characteristics of the vehicle 2A. As a result, even when the weight of the vehicle 2A or the load acting on each wheel changes due to the loading and unloading of the cargo, the vehicle characteristics of the vehicle 2A can be identified with high accuracy, and the accuracy of the vehicle 2A of following the target path can be improved.

Thereafter, the vehicle 2A travels in the identification area IA, and the vehicle coordinating device 1A receives the control command value from the vehicle control device 21 of the vehicle 2A. In addition, the vehicle characteristic identification unit 12 of the vehicle coordinating device 1A receives the detection result of the vehicle 2A by the external sensor ES installed in the identification area IA, and acquires the traveling locus of the vehicle 2A. In addition, the vehicle characteristic identification unit 12 identifies the vehicle characteristic of the vehicle 2A based on the received control command value and the acquired traveling locus.

In addition, the identification accuracy estimation unit 13 of the vehicle coordinating device 1A estimates the identification accuracy of the vehicle characteristics by the vehicle characteristic identification unit 12, similarly to the first embodiment described above. In addition, the automatic driving coordinating unit 14 of the vehicle coordinating device 1A calculates, for example, the traveling path of the vehicle 2A based on the identification accuracy estimated by the identification accuracy estimation unit 13, and transmits the calculated traveling path to the vehicle control device 21 together with the vehicle characteristics and the identification accuracy thereof. As a result, the vehicle coordinating device 1A controls the automatic driving of the vehicle 2A. Thereafter, the vehicle 2A performs automatic driving in the mobility area MA and moves to a loading/unloading area existing in the mobility area MA.

As described above, in the vehicle coordinating device 1A of the present embodiment, the communication unit 11 is communicably connected to the weight sensor WS installed in the identification area IA. In addition, the vehicle characteristic identification unit 12 identifies the vehicle characteristic based on the detection result of the weight of the vehicle 2A by the weight sensor WS acquired via the communication unit 11.

According to the vehicle coordinating device 1A of the present embodiment, by identifying the vehicle characteristics of the vehicle 2A after loading and unloading of the cargo using the weight sensor WS, it is possible to improve the accuracy of following the target path at the time of automatic driving of the vehicle 2A whose vehicle characteristics change due to the loading and unloading of the cargo. As a result, in the loading/unloading area of the mobility area MA, it is possible to prevent an error from occurring in the stop position and angle of the vehicle 2A and to efficiently load and unload the cargo.

In addition, in a case where the vehicle 2A is a towing vehicle, only a trailer head may be caused to travel in the identification area IA while loading and unloading of cargo with respect to a trailer, and the vehicle characteristic identification unit 12 of the vehicle coordinating device 1A may identify the vehicle characteristic. After the loading and unloading of the cargo with respect to the trailer is completed, the trailer and the trailer head are connected to travel in the identification area IA, and the vehicle characteristics can be similarly identified by the vehicle characteristic identification unit 12 of the vehicle coordinating device 1A.

This makes it possible to individually identify the vehicle characteristics of the vehicle 2A with only the trailer head and the vehicle characteristics of the vehicle 2A with the trailer head and the trailer coupled. Therefore, in the vehicle 2A, the identification accuracy of the vehicle characteristics is improved as compared with the case where the vehicle characteristics of the trailer head and the trailer are simultaneously identified, and the accuracy of following the target path during the automatic driving of the vehicle 2A can be improved.

In addition, for example, the vehicle coordinating device 1A of the present embodiment may identify the vehicle characteristics of the vehicle 2A and estimate the identification accuracy each time loading or unloading of the cargo of the vehicle 2A occurs in the mobility area MA. The process of the vehicle coordinating device 1A and the vehicle control device 21 of the vehicle 2A in this case will be described with reference to FIG. 8. FIG. 8 is a flowchart illustrating a flow of processing by the vehicle coordinating device 1A and the vehicle control device 21 of the vehicle 2A of FIG. 6.

Figure 8:
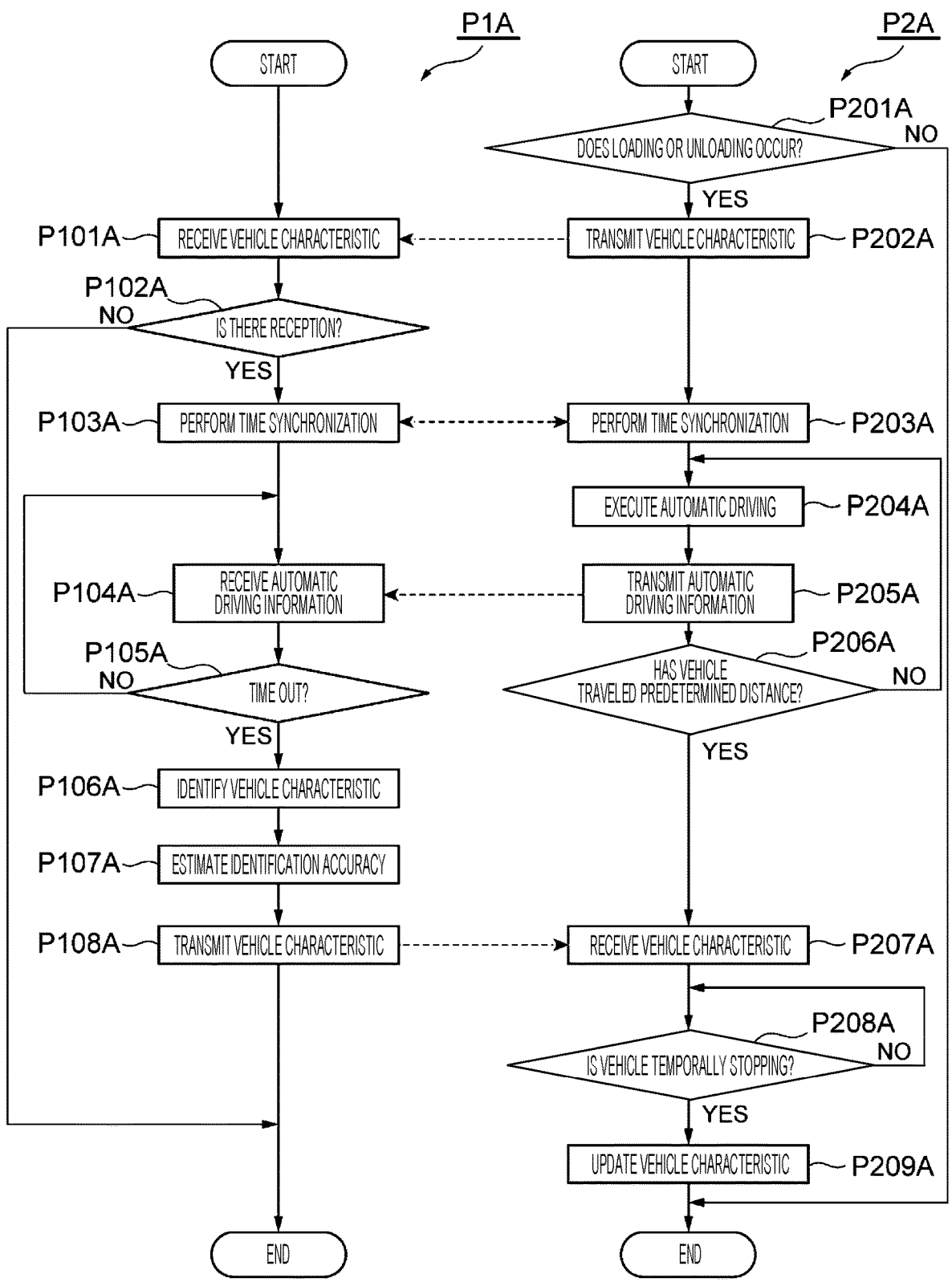
FIG. 8 is a flowchart illustrating a flow of a process by the vehicle coordinating device of FIG. 6.

The vehicle coordinating device 1A and the vehicle control device 21 of the vehicle 2A start processes P1A and P2A illustrated in FIG. 8, respectively. The vehicle control device 21 of the vehicle 2A first executes a process P201A of determining whether cargo has been loaded or unloaded. For example, the vehicle 2A travels on a predetermined travel path during automatic driving under the control of the vehicle control device 21, and loads and unloads cargo in a predetermined loading/unloading area.

Therefore, in the process P201A, the vehicle control device 21 of the vehicle 2A can determine the presence or absence of loading or unloading based on, for example, the position information of the vehicle 2A. In this process P201A, when it is determined that the loading/unloading of the cargo has not occurred (NO), the vehicle control device 21 of the vehicle 2A ends the process P2A illustrated in FIG. 8, and when it is determined that the loading/unloading of the cargo has occurred (YES), a process P202A of transmitting the vehicle characteristics is executed. This process P202A is similar to the process P202 in Embodiment 1 illustrated in FIG. 3.

Meanwhile, when starting the process P1A illustrated in FIG. 8, the vehicle coordinating device 1A first executes a process P101A of receiving the vehicle characteristics from the vehicle control device 21 of the vehicle 2A, and then executes a process P102A of determining whether the vehicle characteristics have been received. When the vehicle coordinating device 1A fails to receive the vehicle characteristic in process P101A, the vehicle coordinating device 1A determines that there is no reception (NO) in process P102A, and ends the process P1A illustrated in FIG. 8.

Meanwhile, when receiving the vehicle characteristic in process P101A, the vehicle coordinating device 1A determines that it is received (YES) in process P102A. In this case, the vehicle coordinating device 1A and the vehicle control device 21 of the vehicle 2A execute time synchronization processes P103A and P203A, respectively. These processes P103A and P203A are similar to the processes P105 and P206 of the first embodiment illustrated in FIG. 3.

Thereafter, the vehicle control device 21 of the vehicle 2A executes an automatic driving process P204A and an automatic driving information transmission process P205A in the mobility area MA, and executes process P206A for determining whether or not the vehicle 2A has traveled a predetermined distance. In this process P206A, when determining that the vehicle has not traveled the predetermined distance (NO), the vehicle control device 21 repeats the above-described processes P204A and P205A.

Meanwhile, the vehicle coordinating device 1A executes a process P104A of periodically receiving the automatic driving information transmitted from the vehicle control device 21 of the vehicle 2A. This automatic driving information includes, for example, an output result of the automatic driving function such as a control command value of automatic driving of the vehicle 2A by the vehicle control device 21 and position information of the vehicle 2A. When the vehicle coordinating device 1A cannot receive the automatic driving information in the process P104 described above, the vehicle coordinating device 1A executes a process P105A of determining whether a predetermined time has elapsed, and when it is determined that the predetermined time has not elapsed (NO) in the process P105A, the vehicle coordinating device 1A repeats the process P104A described above.

When determining that the predetermined time has elapsed (YES) in the process P105A described above, the vehicle coordinating device 1A executes a vehicle characteristic identification process P106A and an identification accuracy estimation process P107A similar to the processes P110 and P111 in the first embodiment described above illustrated in FIG. 3. Thereafter, the vehicle coordinating device 1A executes a vehicle characteristic transmission process P108A, and transmits the vehicle characteristics of the vehicle 2A and the identification accuracy thereof acquired in the processes P106A and P107A to the vehicle control device 21 of the vehicle 2A.

When determining that the vehicle 2A has traveled a predetermined distance (YES) in the process P206A described above, the vehicle control device 21 of the vehicle 2A executes a process P207A of receiving the vehicle characteristics and the identification accuracy transmitted from the vehicle coordinating device 1A. Thereafter, the vehicle control device 21 of the vehicle 2A executes a process P208A of determining whether or not the vehicle 2A is stopped, and when it is determined that the vehicle 2A is traveling (NO), the automatic driving of the vehicle 2A is continued and this process P208A is repeated.

When determining that the vehicle 2A is at a temporary stop and the vehicle 2A is at a temporary stop (YES) in the process P208A, the vehicle control device 21 of the vehicle 2A executes a vehicle characteristic update process P209A. In this process P209A, the vehicle control device 21 updates and stores the vehicle characteristics and the identification accuracy of the vehicle characteristics stored in the memory or the storage device 25 of the vehicle control device 21 to the vehicle characteristics and the identification accuracy of the vehicle 2A received in the process P207 described above.

With such a configuration, not only the accuracy of following the target trajectory by the vehicle 2A can be improved, but also a change in behavior of the vehicle 2A due to a change in vehicle characteristics during traveling of the vehicle 2A by automatic driving can be prevented, and the stability of automatic driving can be improved. In addition, since the accuracy of following the target trajectory by the vehicle 2A is improved, the efficiency of the physical distribution service by the vehicle coordinating device 1A can be improved.

Although the embodiments of the vehicle coordinating device according to the present disclosure have been described in detail with reference to the drawings, the specific configuration is not limited to the embodiments, and design changes and the like without departing from the gist of the present disclosure are included in the present disclosure.

REFERENCE SIGNS LIST 1 vehicle coordinating device
11 communication unit
12 vehicle characteristic identification unit
13 Identification accuracy estimation unit
14 automatic driving coordinating unit
15 database
2 vehicle
2A vehicle
21 vehicle control device
23 in-vehicle external sensor
D object
ES external sensor
IA Identification area
RP reference path
TA maintenance area
WS weight sensor

The invention claimed is:

1. A vehicle coordinating device that coordinates automatic driving of a vehicle by a vehicle control device mounted on the vehicle, the vehicle coordinating device comprising:
   a communication unit communicably connected to the vehicle control device;
   a vehicle characteristic identification unit that acquires a control command value for automatic driving and a traveling locus of the vehicle from the vehicle control device via the communication unit and identifies a vehicle characteristic used for automatic driving;
   an identification accuracy estimation unit that estimates identification accuracy of the vehicle characteristic by the vehicle characteristic identification unit; and
   an automatic driving coordinating unit that coordinates automatic driving of the vehicle based on the identification accuracy estimated by the identification accuracy estimation unit.

2. The vehicle coordinating device according to claim 1, wherein the vehicle characteristic identification unit identifies the vehicle characteristic of the vehicle that has traveled in a predetermined identification area under control of the vehicle control device.

3. The vehicle coordinating device according to claim 2, wherein
the communication unit is communicably connected to an external sensor installed in the identification area, and
the vehicle characteristic identification unit calculates the traveling locus of the vehicle based on a detection result of the vehicle by the external sensor acquired via the communication unit.

4. The vehicle coordinating device according to claim 2, wherein
the communication unit is communicably connected to a weight sensor installed in the identification area, and
the vehicle characteristic identification unit identifies the vehicle characteristic based on a detection result of a weight of the vehicle by the weight sensor acquired via the communication unit.

5. The vehicle coordinating device according to claim 2, wherein
the vehicle control device is connected to an in-vehicle external sensor mounted on the vehicle, and
the vehicle characteristic identification unit acquires a detection result by the in-vehicle external sensor of an object installed in the identification area from the vehicle control device via the communication unit, and identifies an object detection function by the in-vehicle external sensor.

6. The vehicle coordinating device according to claim 2, wherein the vehicle characteristic identification unit transmits a control command value in the identification area to the vehicle control device via the communication unit, and causes the vehicle control device to cause the vehicle to travel in the identification area.

7. The vehicle coordinating device according to claim 2, wherein
the vehicle control device is connected to an in-vehicle external sensor mounted on the vehicle, and
the vehicle characteristic identification unit causes the vehicle control device to cause the vehicle to travel along a reference path displayed in the identification area and detected by the in-vehicle external sensor, and identifies the vehicle characteristic.

8. The vehicle coordinating device according to claim 1, wherein the automatic driving coordinating unit transmits the vehicle characteristic having the identification accuracy estimated by the identification accuracy estimation unit higher than a threshold to the vehicle control device via the communication unit and updates the vehicle characteristic stored in the vehicle control device.

9. The vehicle coordinating device according to claim 1, wherein the automatic driving coordinating unit sets a restriction of the automatic driving by the vehicle control device according to the identification accuracy estimated by the identification accuracy estimation unit.

10. The vehicle coordinating device according to claim 1, wherein the automatic driving coordinating unit preferentially operates the vehicle having the higher identification accuracy estimated by the identification accuracy estimation unit among the plurality of vehicles.

11. The vehicle coordinating device according to claim 1, further comprising a database that stores the vehicle characteristics and the identification accuracy.

12. The vehicle coordinating device according to claim 2, wherein the vehicle characteristic identification unit identifies the vehicle characteristic of the vehicle that has traveled in a maintenance area wider than the identification area under control of the vehicle control device.

\* \* \* \* \*